(12) United States Patent
Streid (10) Patent No.: US 6,196,845 B1
(45) Date of Patent: Mar. 6, 2001

(54) SYSTEM AND METHOD FOR STIMULATING NIGHT VISION GOGGLES

(76) Inventor: Harold R. Streid, 15286 Golden Rain Dr., Chesterfield, MO (US) 63017

(*) Notice: Subject to any disclaimer, the term of this patent is extended or adjusted under 35 U.S.C. 154(b) by 0 days.

(21) Appl. No.: 09/106,250

(22) Filed: Jun. 29, 1998

(51) Int. Cl.[7] ............................................. G09B 9/08
(52) U.S. Cl. ...................... 434/44; 434/41; 434/43; 434/36; 434/38; 345/7; 345/9; 345/141; 345/142; 348/122; 348/123
(58) Field of Search ............... 434/41, 44, 43, 434/36, 11, 38; 345/7, 9, 141, 142; 340/945, 953, 955, 956; 250/341.3, 330; 89/41.05; 348/123, 122

(56) References Cited

U.S. PATENT DOCUMENTS

| | | |
|---|---|---|
| 3,777,308 * | 12/1973 | Borkovsky et al. ...... 340/147 CN X |
| 3,996,672 | 12/1976 | Osofsky et al. . |
| 4,303,394 | 12/1981 | Berk et al. . |
| 4,337,044 | 6/1982 | Palmer . |
| 4,349,815 | 9/1982 | Spooner . |
| 4,512,745 | 4/1985 | Mohon et al. . |
| 4,948,957 * | 8/1990 | Rusche ............................. 434/11 X |
| 5,137,450 | 8/1992 | Thomas . |
| 5,320,534 | 6/1994 | Thomas . |
| 5,380,204 | 1/1995 | Decker . |
| 5,413,438 | 5/1995 | Witt, III . |
| 5,487,665 | 1/1996 | Lechner et al. . |
| 5,582,518 | 12/1996 | Henique et al. . |

* cited by examiner

Primary Examiner—Jessica J. Harrison
Assistant Examiner—Chanda Harris (57) ABSTRACT

A visual display system and method for full and realistic stimulation of night vision goggles according to the present invention includes a display system for stimulating night vision goggles across a large dynamic range. The display system includes a high resolution head tracked area of interest display for a rear projection video display. The system time multiplexes the display of raster and calligraphic images in the area of interest. The system also includes a method of calligraphic light point projection that conserves power by using a head tracked slow speed high sensitivity electromagnetic deflection system to position an electron beam which is modulated in X-Y position in a calligraphic fashion by a high speed secondary yoke to create intense light point images for the area of interest display.

33 Claims, 6 Drawing Sheets

SYSTEM AND METHOD FOR STIMULATING NIGHT VISION GOGGLES

FIELD OF THE INVENTION

The present invention relates generally to visual display systems and methods and, more particularly, to a system and method for stimulating night vision goggles.

BACKGROUND OF THE INVENTION

Visual display systems are commonly used to simulate training environments where training through actual operations would be dangerous, expensive or otherwise impractical. One common application for visual display systems is flight simulation. Conventional flight simulators typically include one or more video display screens onto which video images are projected by one or more projectors, such as cathode ray tubes (CRTs). Flight simulators also usually include a control panel and a joystick for providing input to the visual display system in response to the displayed video images. The control panel and surrounding pilot environment are often realistic simulations of the controls and displays present in the actual aircraft. Thus, the operator can simulate the flight of an aircraft and can respond to the environment as depicted by the visual display. One primary objective of flight simulators is to enhance and optimize the simulated images to present the operator with a high fidelity and realistic training environment.

Pilots often use Night Vision Goggles (NVGs) to enhance vision during night operations. The U.S. military currently uses night vision goggles which intensify light in the near infrared portion of the spectrum. Modern night vision goggles are an accessory to the aviator's helmet and are lightweight, self-contained and battery-operated. By tuning the spectral response of the night vision goggles, compatibility with the greenish-blue aircraft cockpit illumination has been achieved and full utilization made of the longer, reddish wavelengths, which predominate in the light that falls naturally on the earth in the nighttime. Night vision goggles have luminous gain in excess of 100,000 foot lamberts per foot candle and provide resolution and contrast under some conditions approaching that of the unaided eye in daylight. Increased emphasis on night operations coupled with the trend toward reduction in flying time have led to growing concerns about safety and significant need for high fidelity NVG training, particularly in the military sector.

There are two basic types of existing NVG visual display systems for use in training: NVG simulation systems and NVG stimulation systems. Simulation systems provide fully simulated NVG imagery projected onto displays and do not allow the trainee to use actual night vision goggles. Stimulation systems, on the other hand, use a light generated display to artificially stimulate actual night vision goggles to react as they would in true nighttime operations. It is recognized in the field, particularly by military training personnel, that existing NVG display systems of both types are inadequate.

Prior systems that have unsuccessfully attempted to provide full and realistic NVG training include large dome systems, such as the McDonnell Douglas developed Night Attack Weapons Systems Trainer (stimulation type) and the Evans and Sutherland VistaView™ (simulation type); collimated flight simulation displays such as mirror beam splitter and off-axis display systems; helmet-mounted direct NVG stimulators such as the Evans and Sutherland Nite-View™ system; and various helmet-mounted simulated displays.

These previously existing NVG training systems are incapable of providing full and realistic NVG imagery, do not accurately replicate the fit and feel of actual night vision goggles, and/or fail to fully integrate non-NVG enhanced imagery, such as instrument panels, cockpit lighting, and out-of-cockpit imagery visible to the unaided eye by looking around the goggles. Stimulation systems operating with large dome displays do not provide the wide dynamic range necessary to replicate the optical effects encountered when using night vision goggles in actual operations. Collimated displays have low fields of regard, generally considered insufficient for many applications, such as realistic fighter pilot simulation. Helmet-mounted systems are heavy and cumbersome and restrict the operator's head movement, provide no interaction with the crew station, and do not allow full viewing of instrument panels, cockpit lighting, and out-of-cockpit imagery. In addition to the fit and crew station integration problems inherent in all helmet mounted systems, helmet mounted simulated displays cannot provide an actual view of the aircraft heads up display ("HUD") and must incorporate a simulated HUD into the simulated NVG display. The resolution of the miniature CRTs used in simulated NVG displays is significantly less than the resolution of actual night vision goggles. This reduction in resolution results in a lack of realism, particularly for HUD simulation.

Rear projection systems are favored for daytime training because they produce high fidelity imagery within a large field of regard, but, until now, have been incapable of providing realistic NVG stimulation. Rear projection displays have come into favor for use in visual systems for daytime tactical training because of their high contrast and suitability for forming very large fields of regard by juxtaposing multiple screens. These characteristics are also highly desirable for NVG training. However, developers of NVG training systems have heretofore been unable to overcome two basic problems associated with NVG stimulation utilizing rear projection display, namely providing extremely wide dynamic range and adequate depth of focus.

Developers of NVG stimulation systems utilizing rear projection have previously been unable to create a system that provides extremely wide dynamic range (as much as 140 dB) of light intensity typically encountered in the night environment. The range of natural night sky illumination is three orders of magnitude from overcast sky to a clear night sky (full moon). In addition to the natural night sky ambient illumination, pilots are exposed to directly viewed light sources, including artificial light sources such as street lights, airfield lighting, car headlights, weapon effects, explosions, and NVG jammers. On a single night mission an aircrew may encounter extremely low ambient light conditions of the natural night sky and very bright artificial light sources in the same field of view. Extremely wide dynamic range is critical to reproducing this full range of illumination for realistic nighttime training.

In addition, bright artificial light sources create what is commonly referred to as the halo effect when viewed through night vision goggles. That is, when bright point light sources are directly viewed through night vision goggles, the pilot sees a bright central dot surrounded by a larger, circular glow. This "halo" reduces the pilot's ability to distinguish detail in the background areas of the scene. Developers have thus far been unable to produce rear projection NVG system with a dynamic range of at least 140 db. Tests have shown that 140 db is the minimum required to portray the irradiance of the naturally illuminated nighttime scene, and also accurately reproduce the halo effect by stimulating the night vision goggles as if by bright artificial light sources.

A second basic problem that developers of rear projection NVG systems have previously been unable to overcome is providing sufficient depth of focus when attempting to stimulate night vision goggles using close proximity rear projection displays. Because flat panels are used in these displays, the viewing distance is relatively short and tends to vary by a large amount between the center and extremes of each panel. Commonly used types of night vision goggles have objective lenses, which can be focused to the nominal viewing distance. However, the fast objectives required by night vision goggles for maximum light gathering cannot maintain focus for wide variations in object distance. Previous attempts to solve this problem by the obvious method of reducing the diameter of the entrance pupil to the NVG objective lens have been effective in increasing the depth of focus, but at the cost of further limiting the already marginal dynamic range of the display.

For the foregoing reasons, there is a strong need for a system and method for full and realistic stimulation of night vision goggles that provides extremely wide dynamic range and adequate depth of focus. Preferably, the system would be compatible with high fidelity daytime visual displays utilizing rear screen projection and would allow the pilot to use substantially unmodified, conventional night vision goggles.

SUMMARY OF THE INVENTION

The above-mentioned needs are met by the present invention, which is used to stimulate a pair of conventional night vision goggles in a conventional flight simulation environment through a large dynamic range of light intensities. The display system for stimulating the night vision goggles of the present invention preferably includes image generation means for generating video signals that preferably comprise both conventional visible background video and high-fidelity NVG video signals. The system further includes a background image projector that is responsive to the visible background video signals produced by the image generation means for projecting background images and an NVG image projector that projects NVG imagery responsive to the NVG video signals produced by the image generation means. The NVG imagery is preferably capable of stimulating the night vision goggles and, to stimulate the night vision goggles across a wide dynamic light intensity range, includes both near infrared raster imagery and calligraphic imagery.

The preferred stimulation system incorporates image processing means for controlling the NVG image projector such that the NVG image projector displays the near infrared raster imagery and the calligraphic imagery in a time-multiplexed fashion. That is, within a single display frame (e.g., a 60 Hz frame), the NVG image projector displays the near infrared raster imagery for a portion of the frame and then displays the high-intensity calligraphic imagery for the remaining portion of the display frame.

According to one embodiment of the stimulation system, the system provides a passive means to reduce or limit the size of the entrance pupil of the night vision goggles while the raster imagery is displayed such that the imagery may be viewed with a full depth of focus. The size of the entrance pupil is then increased while the high intensity calligraphic imagery is displayed. Preferably, the size of the entrance pupil is controlled in sync with the time-multiplexed display of the raster and calligraphic imagery.

In a preferred embodiment, the night vision stimulation system determines the head position of an operator (e.g., a pilot) of the stimulation system and the NVG video signals are generated in accordance with the operator's line of sight. The NVG image projectors include a means for deflecting the output of the projector to position the imagery along the operator's line of sight. Once the NVG projectors are positioned along the operator's area of interest, the calligraphic imagery may be displayed using secondary deflections that modulate the position of the NVG image projector.

Additionally, the present invention includes a method of displaying images to stimulate night vision goggles. The method preferably generates video signals comprising visible background video and NVG video signals and then projecting both the background images and the NVG images responsive to the generated visible background and NVG video signals. Again, preferably, the NVG images are capable of stimulating the night vision goggles across a wide dynamic range and include time-multiplexed near infrared raster imagery and calligraphic imagery. Preferably, the NVG imagery is polarized and selectively rotated synchronously with the time-multiplexed projection of the near infrared raster images and the calligraphic imagery such that the near infrared raster images are projected as the polarized NVG images are rotated and the calligraphic images are projected as the polarized NVG images are not rotated. The polarization and selective rotation of the images acts as a binary iris extending the dynamic range of the system while maintaining sufficient depth of focus for high detail raster imagery. Thus, the presently preferred invention is capable of stimulating night vision goggles worn by a pilot in a flight simulation environment while significantly reducing or eliminating the depth of focus problem typically associated with conventional systems for simulating or stimulating night vision goggles.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

The night vision stimulation system of the present invention may preferably be used to provide the operator with the large dynamic range (e.g., 140 dB) of light intensities typically encountered during night flight operations by displaying both raster and calligraphic images in a night vision area of interest centered about the operator's visual line of sight. The raster mode is used to display the computer-generated, physics-based, irradiance-mapped model of the sky-horizon-terrain scene. This model includes three-dimensional textured images of natural and man-made features, navigational reference points and targets generated for the current aircraft position and pilot head orientation and presented within the NVG area of interest. This night vision area of interest preferably includes high resolution imagery superimposed over conventional background imagery to create a realistic simulation of nighttime flying. Imagery is image intensified when using conventional night vision goggles and visible to the unaided eye in the visual periphery and directly when looking around the goggles. In the calligraphic mode, only those light sources or reflectors that have sufficient intensity to produce the "halo" effect are portrayed.

As described herein in a preferred embodiment, the night vision stimulation system can be used as part of a flight simulation system that is employed to train military, commercial or other personnel to fly aircraft at night while wearing night vision goggles and to appropriately respond to particular flight situations, especially situations that only occur while employing night vision goggles. The principals of the visual display system described herein, however, can also be employed to simulate other environments and to train personnel for other operations without departing from the spirit and scope of the present invention.

Figure 1:
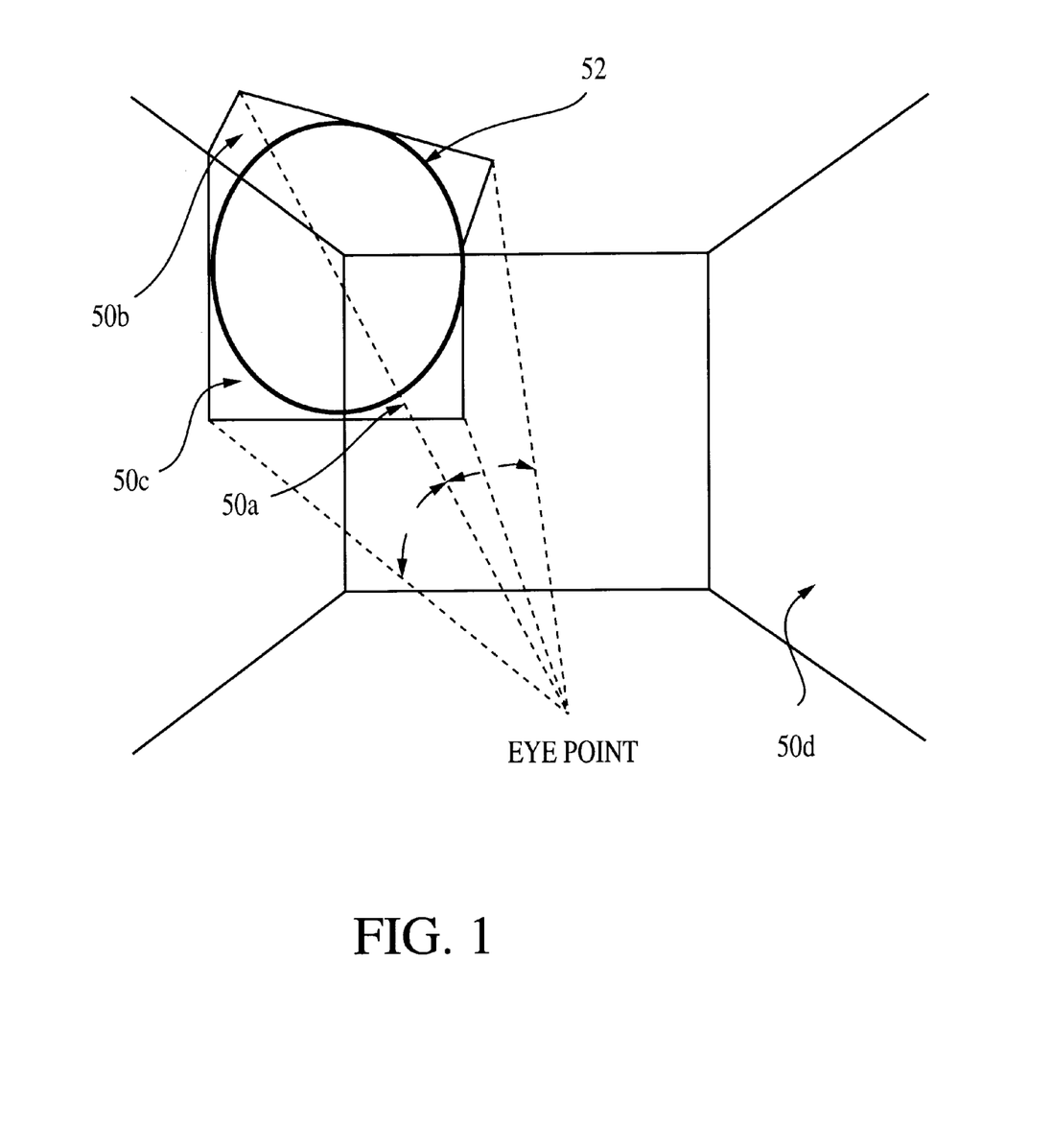
FIG. 1 is a perspective view illustrating a composite display of raster and calligraphic imagery used to stimulate night vision goggles according to the present invention, wherein the imagery is displayed in the field of view of the operator of the system and upon a visible light multiscreen background display.

As shown in FIG. 1, the night vision stimulation system is preferably used in conjunction with a convention flight simulation system such as, for example, the F-18 CV/WST, manufactured by The Boeing Company, the assignee of the present invention. Preferably, such a simulation system typically includes a plurality of display screens 50*a*–50*d* (collectively referred to as reference no. 50) onto which is projected images depicting an out-the-window scenario. The operator of the simulation system is positioned in a simulated cockpit that may include conventional cockpit components such as a throttle and flight stick (having associated controls and switches), a number of head-down cockpit displays displaying various navigation, situational and tactical information, and either a real or simulated head-up display. In order to use the preferred stimulation system, the operator wears a set of convention night vision goggles, which, unlike many prior simulation or stimulation systems, are substantially unaltered.

The visual images generated by the night vision stimulation system are projected onto a plurality of conventional rear projection display screens 50, for example, conventional flat screen panels capable of displaying color images projected from rear projection projectors. Preferably, the display screens 50 do not alter the polarization of the light as the light (i.e., imagery) passes through it. The number of display screens 50 is dependent on the degree of realization desired in the simulation. For example, for a simulation of the forward 216° of the operator's vision, four display screens 50 would normally be used. For example, as shown in FIG. 1, a center display screen 50*a* is positioned directly in front of the operator and normal to the operator's line of sight (when facing forward out of the cockpit). A second display screen 50*b* is preferably positioned adjacent to and substantially above display screen 50*a* and is generally used to project images that are above the operator's line of sight (again, when facing forward out of the cockpit). Display screens 50*c* and 50*d* are preferably positioned to the left and right, respectively, of the center display screen 50*a*. The angle between the four display screens 50 may be adjusted from 90 to 180 degrees, and is typically 108 degrees. The display screens 50 illustrated in FIG. 1 may be supplemented by an additional three display screens behind the operator to present a full 360° of viewing. Of course, the visual display system of the present invention need not include all four display screens 50, but can include as few as one display screen without departing from the spirit and scope of the present invention.

As further shown in FIG. 1, the preferred embodiment of the invention includes a night vision image 52 displayed at an area of interest that overlays near infrared imagery (generally visible only to an operator wearing night vision goggles) upon a visible light rear projected multiscreen background image. The dimensions of the night vision image 52 generally correspond to the field of view of a typical set of night vision goggles, e.g., 30 to 40 degrees circular. The display system creates a wide instantaneous background field of view and a wide field of regard head tracked night vision image. The composite display is rear projected onto the array of flat rear projection screens 50. The night vision image has a smaller size and a higher resolution than the background image in order to provide the operator with additional detail and higher fidelity in the area of interest that the operator is viewing through the night vision goggles.

Preferably, each screen 50 has at least two dedicated projectors to display the background and night vision images. When the field of view of the night vision goggles overlap adjacent screens 50, multiple projectors are required to be active. Because the night vision image is not usually viewed about the normal from the eye point to the plane of the projection screen 50, it is preferred that the computer image generator used to generate the night vision image incorporate a special offset prospective projection to provide true perspective imagery when viewed from the pilot's eyepoint.

Figure 2:
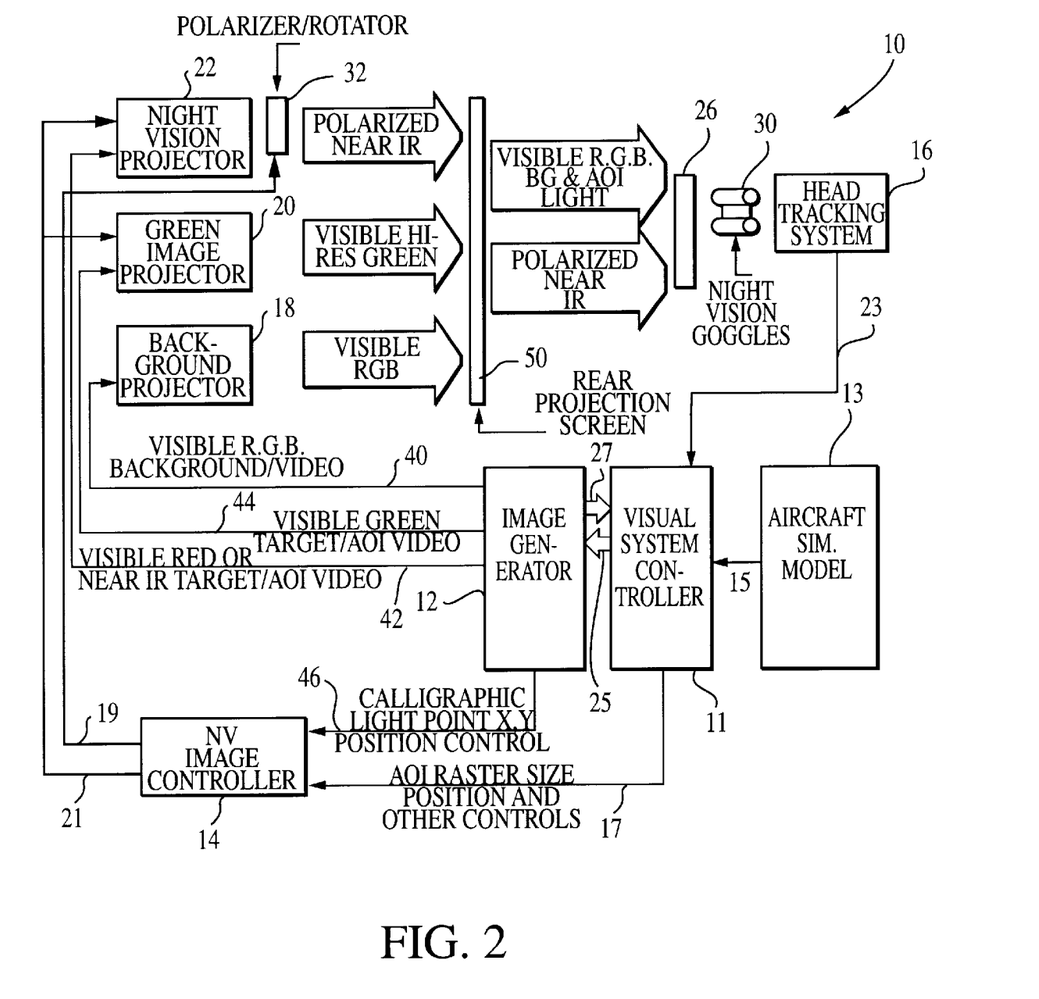
FIG. 2 is a block diagram showing the presently preferred major components of one embodiment of the present invention.

Turning now to FIG. 2, the night vision stimulation system 10 preferably includes a conventional aircraft simulation model 13, that generates and controls visual and environmental parameters 15 such as, for example, the operator's aircraft position and attitude, the position and type of airborne and ground station targets displayed in the simulation, time of day and other required flight and tactical situation information. The system also includes a conventional head tracking system 16, which is mounted above or near the operator's head and tracks the horizontal, vertical, and rotational movement of the operator (not shown) and provides the operator's head orientation 23 (which comprises a three-dimensional position and a vector describing the operator's line of sight) to the visual system controller 11.

The visual system controller 11 preferably integrates all of the other functional elements into a synchronized and coordinated system. The visual system controller 11 receives the operator's head orientation 23 from the head tracking system 16 and receives the visual environment parameters 15 from the aircraft simulation model 13. As is known, the head tracking system 16 tracks the line-of-sight of an operator of the night vision stimulation system 10 so that the night vision stimulation image can be positioned in the line of sight of the operator. Based upon this received information 15, the visual system controller 11 provides viewport parameters and environment commands 25 to an image generator 12 and provides data and control signals 17 to the night vision image controller 14. The data and control signals 17 preferably include the position (i.e., X and Y deflections) and size of the night vision image (i.e., that portion of the display corresponding to the operator's line of sight onto which the high resolution video images used to stimulate the night vision goggles will be presented). The data and control signals 17 also include other conventional information required to initialize, test and operate the projectors used in the night vision stimulation system 10.

The image generator returns data 27 about the simulated visual environment to the visual system controller 11. This data includes such information as the distance to the nearest visible object along a particular line of sight or the occurrence of an intersection of the eyepoint with the visible terrain.

The preferred night vision stimulation system 10 includes image generator 12, a conventional component of visual display systems capable of providing video signals representative of three-dimensional images at a predetermined frame rate, which generates all of the video to be displayed to the operator as part of the simulation, including visible and near infrared images for stimulation of the night vision goggles 30. The video signals generated by the image generator 12 are representative of the plurality of images (i.e., the background and near infrared raster and calligraphic images). As described above, the image displayed on the display screens 50 includes a background image having a predetermined size and resolution. In order to display this background video, the background image is generally generated by the image generator, which provides red, green and blue background video signals 40 to the background projectors 18. The background video signals 40 include data used by the background projectors to form the elements of the nighttime environment (i.e., sky, horizon, and terrain) seen by the unaided eye when the night vision goggles 30 are not worn or when the pilot looks around the goggles 30 during the simulation session. The image generator 12 also provides visible and near infrared video signals 42, which include information sufficient to project both raster and calligraphic imagery, to the night vision projectors 22. Additionally, the image generator 12 preferably provides visible green video signals 44 to the green image projectors 20. The image generator 12 preferably produces the frames of video images that form the video signals 40, 42, and 44 at a predetermined frequency or frame rate such as, e.g., 60 Hz.

The image generator 12 also generates and provides calligraphic light point x-y position and intensity signals 46 to the night vision image controller 14. These position and intensity signals 46 correspond to the operator's area of interest, i.e., the portion of the viewing screen(s) 50 to which the operator's vision is currently directed. The signals 46 are sufficient to command the night vision image controller 14 and the night vision projectors 22 to display calligraphic images, such as, for example, city or vehicle lights, airfield lighting, aircraft anti-collision lights, beacons or NVG jamming sources.

The night vision image controller 14 contains all of the special purpose electronics and processing required to drive and control the night vision projectors 22 and the green image projectors 20 including controlling both the raster mode of display as well as display of calligraphic images in the operator's area of interest. Thus, the night vision image controller 14 provides CRT control signals 21 to the green image projectors 20 and the night vision projectors 22.

A plurality of background projectors 18, at least one of which is associated with each display screen 50, receive the visible red, blue, and green background video signal 40 from the image generator 12 and, in response to such signals, generate low resolution background imagery (which is generally not tracked or associated with the operator's line of sight). The background projectors 18 are generally RGB projectors, such as model 3600 manufactured by Ampro, Inc., which projects a background image having red, green and blue color components. However, a monochrome background projector that produces a monochromatic background image can also be employed. The background imagery is visible in the peripheral field outside the operator's area of interest (i.e., the portion of the visual environment corresponding to the operator's line of sight) and, thus, may be fairly low resolution (e.g., 10 arc-minutes per optical line pair). Preferably, one background projector 18 is used for each display screen 50 included within a particular configuration of the present invention.

Preferably, the night vision stimulation system 10 includes one night vision projector 22 for each display screen to provide near-infrared raster and calligraphic imagery to stimulate the night vision goggles 30. The night vision projectors 22 include a special purpose min-raster/calligraphic projector, which projects images having red and near infrared color components, displaying images onto a cathode ray tube having a phosphor coating that overlaps the visible and near infrared portions of the optical spectrum. The night vision projectors 22 also preferably include a conventional lens that maintains uniform resolution over the entire active area of the CRT phosphor screen. The night vision projectors 22 receive CRT control signals 21 from the night vision image controller 14 to position, focus and set the brightness of the video raster and calligraphic light points. The night vision projectors 22 receives the visible and near infrared video signals 42 from the image generator 12. As described below, the night vision projectors 22 may be used to provide high resolution red and green visible imagery as part of a daytime simulator visual system. When in the night vision goggles stimulation mode, the system may include a near infrared longpass filter (not shown) disposed between each of the night vision projectors 22 and the associated display screens 50 to block the projection of visible light. Typically the filter is a longpass filter having a cut-off frequency of approximately 665 nanometers such that the resulting night vision image is barely visible as a generally reddish haze to the unaided eye. However, when viewed through night vision goggles 30, the resulting night vision image is within the predetermined frequency range of the goggles such that the operator can readily view the night vision image.

The night visual stimulation system 10 may optionally include a plurality of green image projectors 20, used to display conventional green raster images. The green image projectors 20 include the same essential components as the above-described night vision projectors 22 (including a projector, cathode ray tube, and lens). The green image projectors 20 receive the visible green video 44 from the image projector 12 and the CRT control signals 21 from the night vision image controller 14. The green image projectors 20 then display visible, high resolution green raster imagery onto the display screen(s) 50.

Preferably, as described in more detail below, the night vision stimulation system 10 includes devices to switch the size of the NVG entrance pupil between large and small states depending upon the polarization of the incident light. The entrance pupil size is preferably switched from a fully open diameter up to 1 inch to a stopped down diameter of 0.1 inch or less. A preferred device is a small, passive element, such as, for example, the polarization analyzer 26, which slips on the front of the objective lens of the night vision goggles 30 and may be easily removed at the end of the training session. The polarization analyzer 26 preferably does not alter the form, fit or weight of the night vision goggles to any noticeable degree.

In its preferred embodiment, the night vision stimulation system 10 operates in a time-multiplexed fashion, switching between a raster mode and a calligraphic mode. This time-multiplexed feature only effects the imagery displayed within the NVG field of view by selecting the type of imagery (raster or calligraphic) displayed by the night vision projectors 22. The raster mode is used to stimulate the night vision goggles 30 through the full 60 db dynamic range of the naturally illuminated nighttime scene. Preferably, the image generator 12 produces at least 10 bits of resolution per pixel (i.e., picture element within the projection CRTs) to support the raster mode. All naturally illuminated database terrain as well as all natural and cultural features are displayed in the raster mode. The calligraphic mode is used to stimulate the night vision goggles 30 at intensity levels comparable to those encountered when intense artificial light sources are viewed directly, i.e., street lights or aircraft anti-collision lights.

Figure 4:
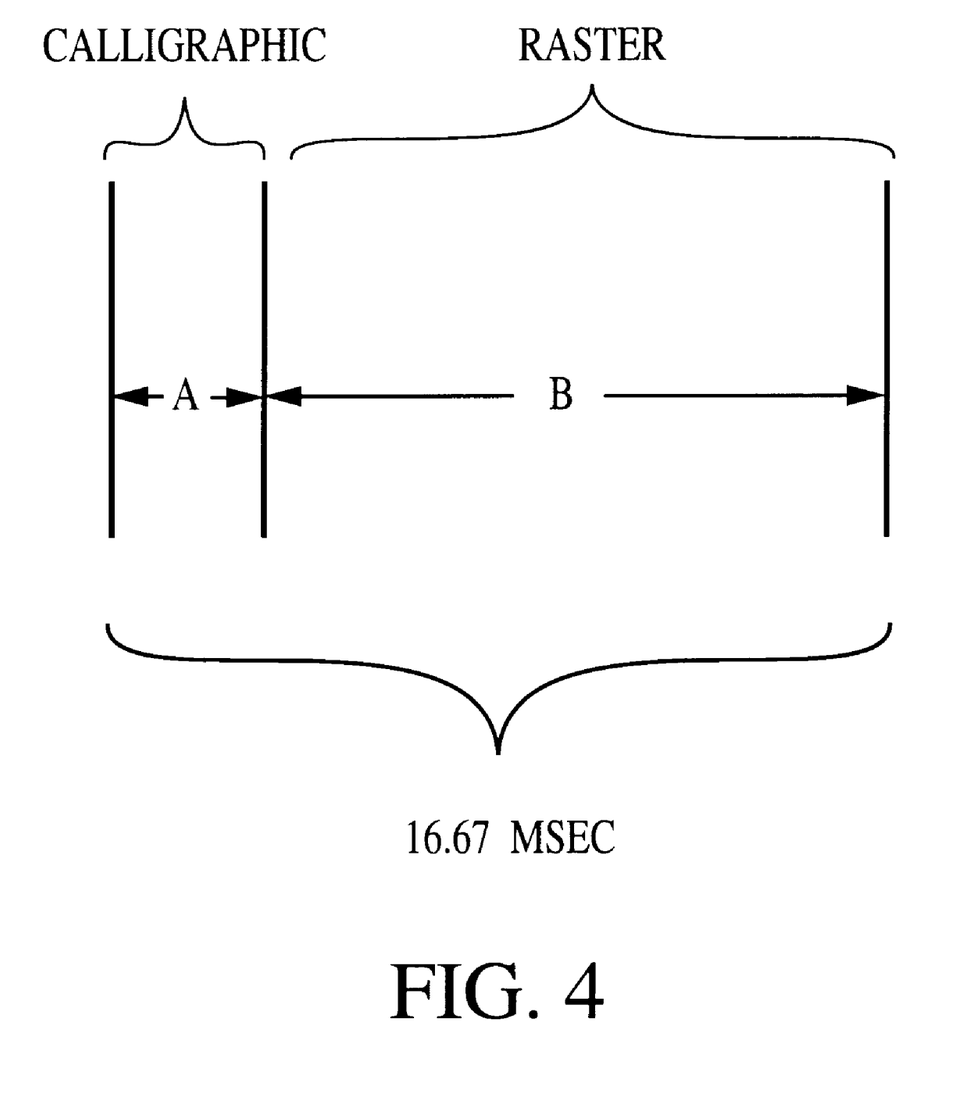
FIG. 4 is a timing diagram illustrating the multiplexed timing relationship for the raster and calligraphic modes.

FIG. 4 provides a timing diagram, illustrating the relationship between the raster and calligraphic modes. Assuming that the night vision stimulation system is using the preferred update rate of 60 Hz, each display frame extends for 16.67 msec. During a first portion of each display frame (identified as "A" on FIG. 4), which may extend, for example, for 1 to 2 msec, the night vision projector 22 displays calligraphic imagery. During the remainder of the 60 Hz display frame, the night vision projector 22 displays near infrared raster imagery. When the calligraphic imagery is alternated with the near infrared imagery at a 60 Hz rate, a full 140 dB of dynamic range is provided for realistic stimulation of the night vision goggles 30.

Preferably, the night vision stimulation system 10 of the present invention includes a means for controlling and optimizing the entrance pupil of the night vision goggles 30. The entrance pupil of the night vision goggles 30 is preferably limited during the period of time the night vision projector 22 is projecting near infrared raster imagery so that full acuity is maintained in the night vision goggles 30 regardless of the operator's head orientation or position. However, during the display of calligraphic images, the entrance pupil of the night vision goggles 30 is preferably fully open so that the image intensifiers of the night vision goggles 30 may be stimulated through the full range of light source effects. The entrance pupil may remain fully open because the imaging of intense point light sources represents a breakdown in the normal low light level imaging.

Figure 3A:
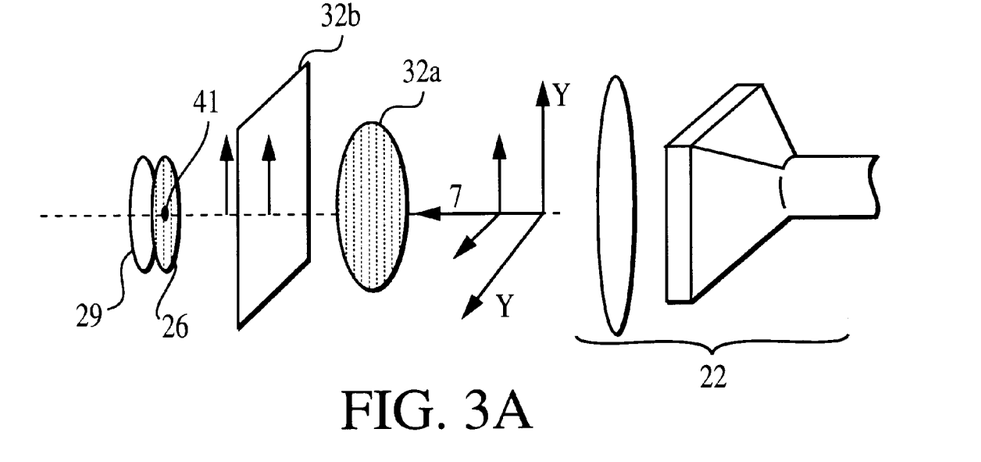
FIG. 3 is a diagram illustrating certain components used in the present invention to control the multiplexed projection of near infrared raster and calligraphic imagery.
Figure 3B:
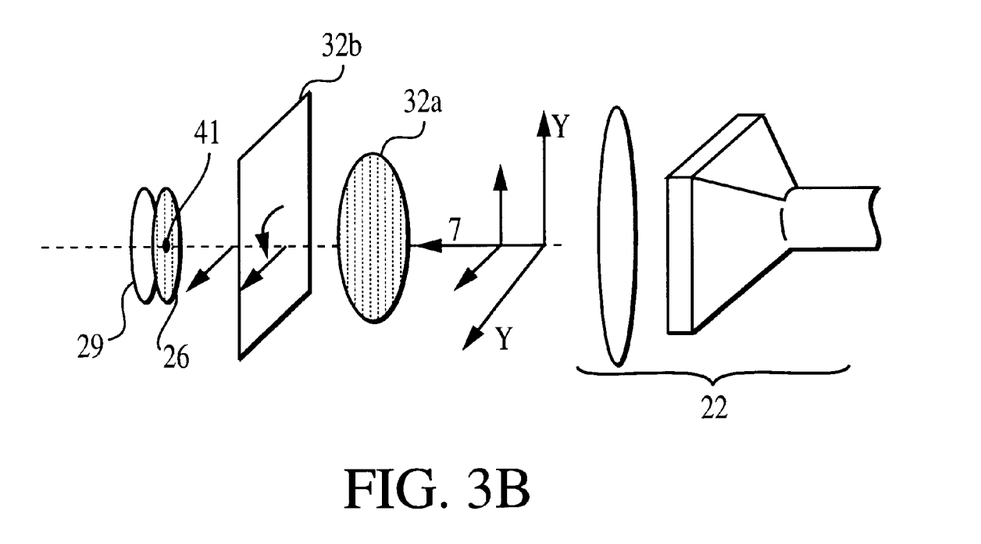

In order to optimize the size of the entrance pupil of the night vision goggles 30, the present invention incorporates the principles of a binary iris as shown in FIG. 3. During the display of calligraphic images, light (i.e., the images) exiting the night vision projector 22 is preferably polarized by a convention imaging polarizer 32a. The polarized image then passes to a rotator 32b, which is preferably a fast-switching, active liquid crystal device such as, for example, the pi-cell, which is capable of rotating light. Preferably, the rotator 32b may rotate the light linearly (as shown in FIG. 3) or circularly.

During the calligraphic mode, the rotator 32b remains in an un-rotated position allowing the light to pass through unaltered. The light then encounters the polarization analyzer 26 having nearly the same polarization as polarizer 32a, which allows the light to pass thorough and reach the objective 29 and enter the night vision goggles 30.

As the system switches to displaying raster images, the rotator 32b rotates the raster image, allowing the polarization analyzer 26 to block most of the light incident at the entrance pupil of the night vision goggles 30. Light that does enter the night vision goggles 30 passes through a small open aperture 41 in the center of the polarization analyzer 26. This aperture 41 is small enough (e.g., having a diameter of approximately 0.1 inches) to maintain full acuity of near infrared raster imagery for all operator-to-screen distances.

The rotation of the rotator 32b and output of the night vision projector 22 are synchronized by the night vision image controller 14 so that the binary iris function allows for an optimum entrance pupil size for the night vision goggles 30. This is preferably accomplished by switching at a 120 Hz rate between the two modes of operation, i.e., raster mode in which the rotator 32b rotates the polarized near infrared imagery and calligraphic mode in which the rotator 32b allows the polarized calligraphic image to pass through unaltered, as controlled by data line 19.

As discussed above, the night vision projector 22 time-multiplexes the display of both raster and calligraphic imagery. As used in the present invention, the night vision projector 22 includes a main, low speed deflection coil responsible for positioning the projector to project toward the head-tracked area of interest. The night vision projector 22 uses linear current control through the main deflector coil for positioning the instantaneous field of view within the larger field of regard, i.e., the rear projection screen 50. Because the location of this instantaneous field of view is tied to orientation of the operator's head, it changes relatively slowly. For this reason, the yoke of the main deflection coil can be a relatively high inductance and high sensitivity coil, requiring little current and, hence, little power.

Figure 5A:
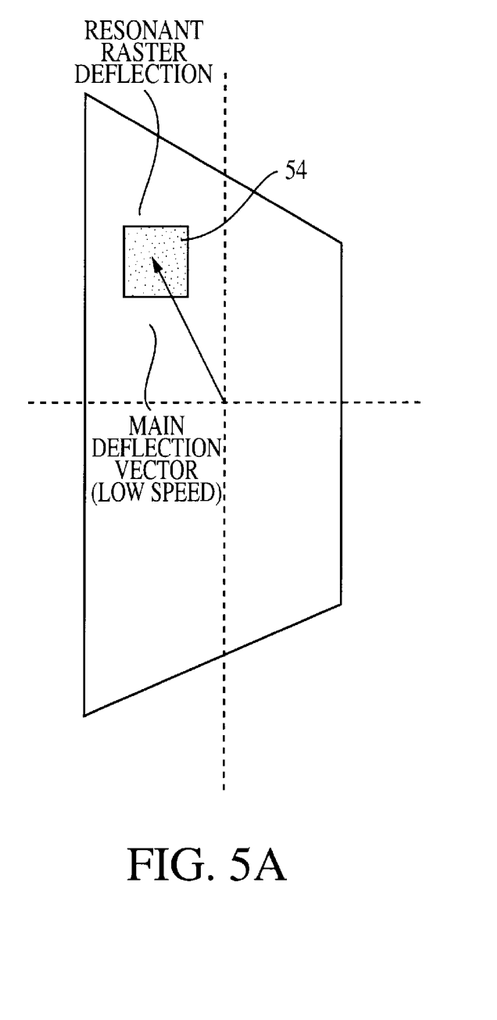
FIG. 5 is a diagram illustrating the deflection of the image projectors used to display the raster and calligraphic imagery according to the present invention.

As shown in FIG. 5a, while the night vision projectors 22 are displaying the raster imagery, a conventional resonant fly-back type horizontal scan 54 is used. This mode is also low power because most of the energy of the fly-back retrace is recaptured to drive the active sweep. As is conventionally known, geometry correction is preferably performed to correct for second and third order effects of electromagnetic pincushion and other nonlinearities. This may be accomplished through the low inductance windings of a secondary deflection yoke, as is common in color or projection CRTs. This correction also consumes little power because the amount of geometry correction required within the relatively small active raster area of interest is also relatively small.

Figure 5B:
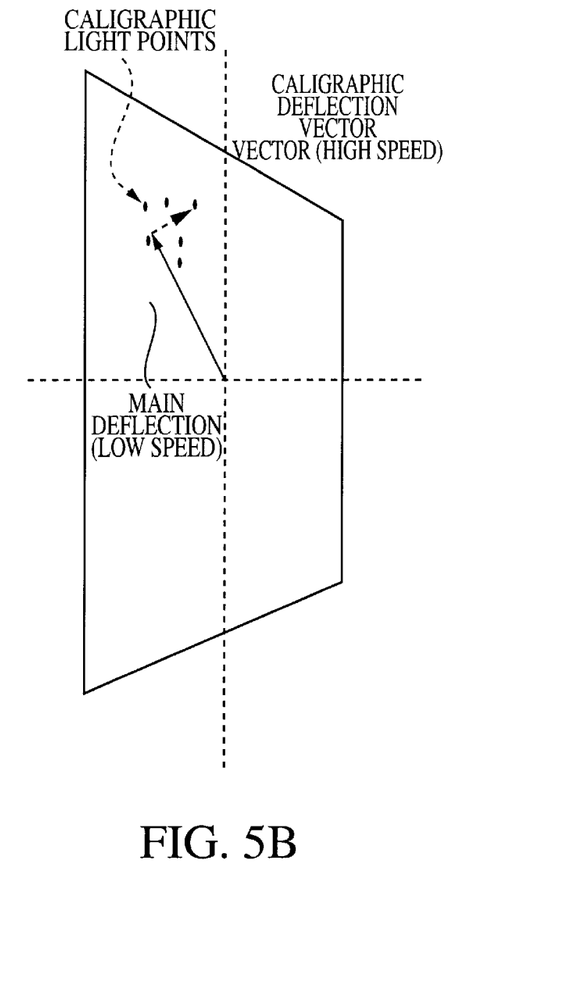

During the period of time that the night vision projectors 22 are projecting calligraphic images, as shown in FIG. 5b, the main yoke is maintained in the same position. The fly-back sweep is temporarily halted and secondary deflection coils are used to calligraphically position the beam to draw a series of light points. The beam is paused and refocused for each light to allow very high current levels to be drawn from the phosphor screen and to create very high radiance without risk of damaging the phosphor.

The power consumed in the CRT deflection system for the calligraphic mode is low for several reasons. First, the number of very bright lights in the limited instantaneous field of view of the night vision goggles is likely to be small and lower intensity lights will be imaged in the raster mode. Therefore, the duty cycle of the calligraphic mode is low, for example five to ten percent or less. In addition, most of the beam positioning comes from the high sensitivity main yoke, which positions the head tracked field of view within the field of regard. Therefore, the X-Y calligraphic positioning currents are small, resulting in low calligraphic power.

Figure 6:
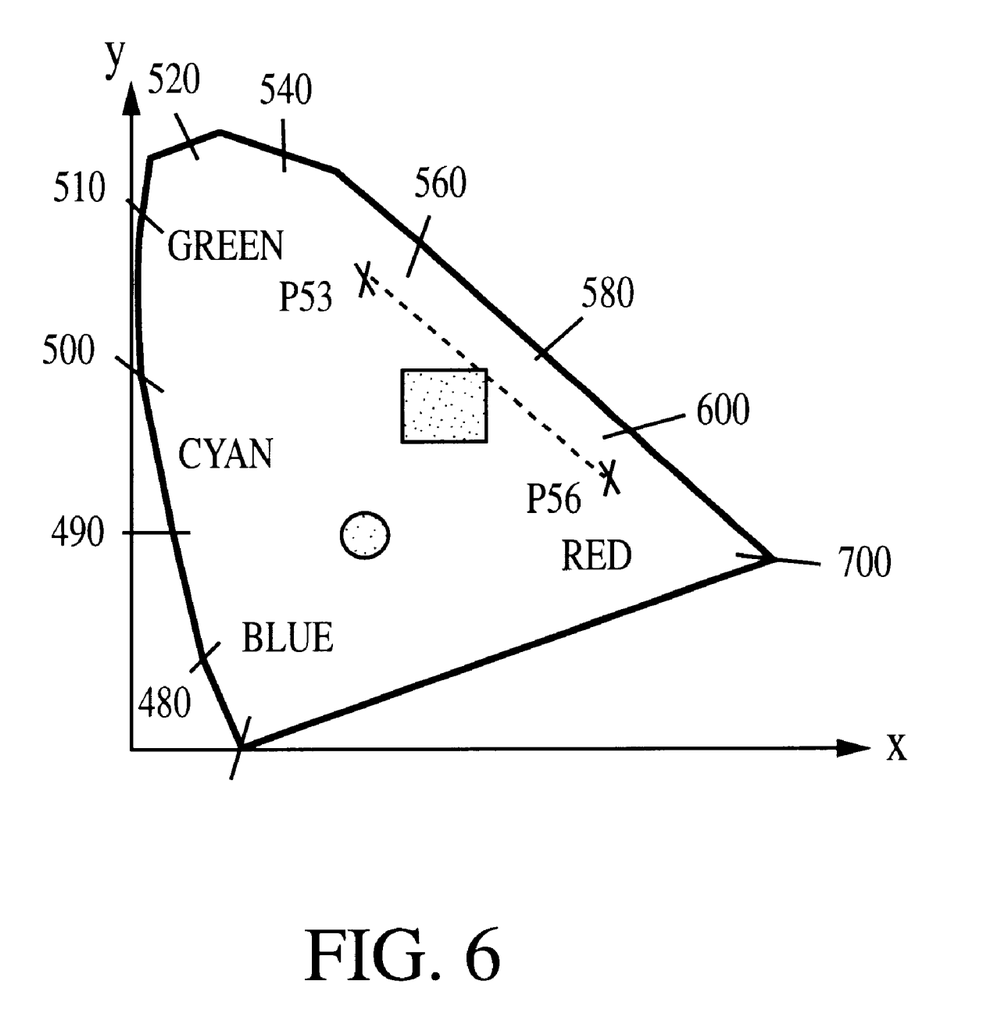
FIG. 6 is a graph illustrating the range of chromaticities required to accurately represent various images in an aircraft flight simulator.

In addition to providing stimulation of night vision goggles, the preferred embodiment's inclusion of the night vision projectors 22 has significant advantages for daytime visual simulation. The typical chromaticity values for terrain world-wide are reported in the Air Force Camouflage Handbook (AFWAL-TR-86 -1028). When snow cover and water are eliminated from the list of typical terrains, the range of chromaticities required to represent the remaining terrain types is shown by the small shaded rectangle in FIG. 6. The line drawn between two X's in the figure shows the range of chromaticities that can be represented by the red (P56) and green (P53) phosphors which could be used. In prior art simulation systems, the high resolution red and green beam penetration CRTs have been used satisfactorily in a two-color system to satisfy a wide range of visual requirements for flight simulation training. Because the night vision projectors 22 are capable of providing high resolution red images, the projectors 22 may be used to enhance the resolution of area of interest inset images corresponding, for example, to the operator's line of sight. The red-green color gamut provided by the combination of the high resolution red CRT used in the night vision projectors and the green CRT used currently to display air targets in the daytime scene is supplemented by lower resolution blue light from the background projectors when less detail differentiated water and snow covered scenes are portrayed without the additional expense of a blue CRT dedicated to the area of interest. Yet another training task in which this type of display system may be used is carrier landing training. In carrier landing simulation, red, green and amber lights of the Fresnel Lens Optical Landing System (FLOLS) are presented in high resolution, true color and high color saturation using an appropriate combination of red and green calligraphic light points. The night vision projectors 22 may be used to generate these light points.

The above described embodiments of the present invention overcome the problems heretofore encountered by developers of night vision goggle stimulation systems used with rear projection displays. The invention provides extremely wide dynamic range (as much as 140 dB) while affording adequate depth of focus, critical characteristics heretofore unseen in rear projecting night vision goggle stimulation systems. As such, the realism of the display system of the present invention surpasses anything previously available. The present invention has numerous advantages over existing systems, including greater contrast and dynamic range than dome display systems, greater field of regard and lower power calligraphic light generation than collimated flight simulation displays, greater fidelity in fit, form and crew station interface than helmet mounted night vision goggle stimulators, greater fidelity in the appearance of night vision imagery than helmet mounted simulated displays, and compatibility with high fidelity daytime visual displays utilizing rear screen projection.

Although the present invention has been described in considerable detail with reference to certain preferred embodiments thereof, other embodiments are possible. Therefore, the scope of the appended claims should not be limited to the description of the preferred embodiments contained herein.

I claim:

1. A display system for stimulating night vision goggles comprising:
    image generation means for generating video signals comprising visible background video and NVG video signals;
    background image projection means operatively connected to the image generation means for receiving the visible background video signals produced by the image generation means for projecting background images;
    NVG image projection means operatively connected to the image generation means for receiving the NVG video signals produced by the image generation means for projecting NVG imagery, said NVG imagery capable of stimulating the night vision goggles and comprising near infrared raster imagery and calligraphic imagery; and
    image processing means for controlling the NVG image projection means such that the NVG image projection means time-multiplexes the projection of the near infrared raster imagery and the calligraphic imagery.

2. The display system of claim 1 further comprising means for polarizing the projected NVG imagery projected by the NVG image projection means.

3. The display system of claim 2 wherein the means for polarizing comprises means for either circularly or linearly polarizing the projected NVG imagery.

4. The display system of claim 2 wherein the night vision goggles have an associated entrance pupil size, the display system further comprising means for selectively rotating the polarization of the NVG imagery and for controlling the entrance pupil size of the night vision goggles.

5. The display system of claim 4 wherein the means for selectively rotating the polarization of the NVG imagery and for controlling the entrance pupil size comprises a polarization rotater mounted at the NVG image projection means and a polarization analyzer attached to the night vision goggles, said polarization analyzer comprising a polarizing filter having a small aperture, wherein only the portion of the rotated, polarized near infrared raster imagery in alignment with the aperture will pass through the aperture to stimulate the night vision goggles as the near infrared imagery is projected.

6. The display system of claim 4 wherein the means for selectively rotating the polarization of the NVG imagery rotates the polarization of the NVG imagery synchronously with the time-multiplexed projection of the near infrared raster imagery and the calligraphic imagery such that the near infrared raster imagery is projected as the polarization of the NVG imagery is rotated and the calligraphic imagery is projected as the polarization of the NVG imagery is not rotated.

7. The display system of claim 1 wherein the NVG imagery is capable of stimulating the night vision goggles over an optical dynamic range up to 140 db.

8. The display system of claim 1 wherein the video signals generated by the image generation means further comprise visible, high resolution green video, the display system further comprising high resolution image projection means responsive to the visible, high resolution green video produced by the image generation means for projecting visible, high resolution green imagery.

9. The display system of claim 1 further comprising means for determining the head position of an operator of the display system, wherein the image generation means generates appropriate NVG video signals according to the determined head position of the operator.

10. The display system of claim 1 further comprising main deflection means for producing positioning signals to position the NVG image projection means.

11. The display system of claim 10 wherein the main deflection means produces the positioning signals in response to the line-of-sight of an operator of the display system such that the NVG imagery is positioned in the line-of-sight of the operator.

12. The display system of claim 10 further comprising means for continuously monitoring the horizontal, vertical, and rotational movement of the operator's head, and wherein the positioning signals are indicative of said movement.

13. The display system of claim 10 further comprising secondary deflection means for modulating the position of the NVG image projection means for displaying the calligraphic imagery.

14. The display system of claim 1 further comprising a plurality of display screens responsive to the background image projection means and the NVG image projection means for displaying the background images and the NVG imagery.

15. The display system of claim 14 wherein the NVG image projection means comprises a plurality of image projectors for projecting the NVG imagery, wherein at least one of the image projectors is associated with each display screen.

16. A flight simulation training system for training operators in the use of night vision goggles comprising:
  image generation means for generating video signals comprising visible background video and NVG video signals;
  background image projection means operatively connected to the image generation means for receiving the visible background video signals produced by the image generation means for projecting background images;
  NVG image projection means operatively connected to the image generation means for receiving the NVG video signals produced by the image generation means for projecting NVG imagery, said NVG imagery capable of stimulating the night vision goggles and comprising near infrared raster imagery and calligraphic imagery;
  means for controlling the NVG image projection means such that the NVG image projection means time-multiplexes the projection of the near infrared raster imagery and the calligraphic imagery;
  means for polarizing and selectively rotating the NVG imagery synchronously with the time-multiplexed projection of the near infrared raster imagery and the calligraphic imagery such that the near infrared raster imagery is projected as the polarized NVG imagery is rotated and the calligraphic imagery is projected as the polarized NVG imager is not rotated; and
  a polarization rotater mounted at the NVG image projection means and a polarization analyzer attached to the night vision goggles, said polarization analyzer comprising a polarizing filter having a small aperture, wherein only the portion of the rotated, polarized near infrared raster imagery in alignment with the aperture will pass through the aperture to stimulate the night vision goggles as the infrared raster imagery is projected.

17. The display system of claim 16 further comprising means for determining the head position of an operator of the display system, wherein the image generation means generates appropriate NVG video signals according to the determined head position of the operator.

18. The display system of claim 16 further comprising main deflection means for producing positioning signals to position the NVG image projection means.

19. The display system of claim 18 wherein the main deflection means produces the positioning signals in response to the line-of-sight of an operator of the display system such that the NVG imagery is positioned in the line-of-sight of the operator.

20. The display system of claim 18 further comprising means for continuously monitoring the horizontal, vertical, and rotational movement of the operator's head, and wherein the positioning signals are indicative of said movement.

21. The display system of claim 18 further comprising secondary deflection means for modulating the position of the NVG image projection means for displaying the calligraphic imagery.

22. A method of displaying images to stimulate night vision goggles comprising the steps of:
  generating video signals comprising visible background video and NVG video signals;
  projecting background images responsive to the generated visible background video signals;
  projecting NVG images responsive to the generated NVG video signals, wherein said NVG images are capable of stimulating the night vision goggles and comprise time-multiplexed near infrared raster imagery and calligraphic imagery; and
  polarizing and selectively rotating the NVG images synchronously with the time-multiplexed projected near infrared raster images and the calligraphic imagery such that the near infrared raster images are projected as the polarized NVG images are rotated and the calligraphic images are projected as the polarized NVG images are not rotated,
  wherein said night vision goggles comprise a polarization rotater and a polarization analyzer, said analyzer comprising a polarizing filter having a small aperture, wherein only the portion of the rotated, polarized near infrared raster imagery in alignment with the aperture will pass through the aperture to stimulate the night vision goggles as the infrared raster imagery is projected.

23. The method of claim 22 further comprising the steps of determining the head position of an operator of the display system, and generating appropriate NVG video signals according to the determined head position of the operator.

24. The method of claim 23 further comprising the step of continuously monitoring the horizontal, vertical, and rotational movement of the operator's head, and wherein the NVG video signals are generated based on said movement.

25. The method of claim 22 further comprising the step of producing positioning signals to position the projection of NVG images in response to the line-of-sight of an operator of the display system such that the NVG imagery is positioned in the line-of-sight of the operator.

26. A display system for stimulating night vision goggles comprising:
  an image generator adapted to generate video signals comprising visible background video and NVG video signals;
  a background image projector operatively connected to the image generator and adapted to receive the visible background video signals produced by the image generator to project background images;
  an NVG image projector operatively connected to the image generator adapted to receive the NVG video signals produced by the image generator to project NVG imagery, said NVG imagery capable of stimulating the night vision goggles and comprising near infrared raster imagery and calligraphic imagery; and an image processor adapted to control the NVG image projector such that the NVG image projector time-multiplexes the projection of the near infrared raster imagery and the calligraphic imagery.

27. The display system of claim 26 wherein the night vision goggles have an associated entrance pupil size, the system further comprising a polarization rotater mounted at the NVG image projector and a polarization analyzer attached to the night vision goggles for either circularly or linearly polarizing the projected NVG imagery and for controlling the entrance pupil size of the night vision goggles, said polarization analyzer comprising a polarizing filter having a small aperture, wherein only the portion of the rotated, polarized near infrared raster imagery in alignment with the aperture will pass through the aperture to stimulate the night vision goggles as the near infrared raster imagery is projected.

28. The display system of claim 23 wherein the polarization rotater rotates the polarization of the NVG imagery synchronously with the time-multiplexed projection of the near infrared raster imagery and the calligraphic imagery such that the near infrared raster imagery is projected as the polarization of the NVG imagery is rotated and the calligraphic imagery is projected as the polarization of the NVG imagery is not rotated.

29. The display system of claim 26 wherein the video signals generated by the image generator further comprise visible, high resolution green video, the display system further comprising a high resolution image projector responsive to the visible, high resolution green video produced by the image generator for projecting visible, high resolution green imagery.

30. The display system of claim 26 further comprising a head tracker to determine the head position of an operator of the display system, wherein the image generator generates appropriate NVG video signals according to the determined head position of the operator.

31. The display system of claim 26 further comprising a main deflector for producing positioning signals to position the NVG image projector.

32. The display system of claim 31 wherein the main deflector produces the positioning signals in response to the line-of-sight of an operator of the display system such that the NVG imagery is positioned in the line-of-sight of the operator.

33. The display system of claim 31 further comprising a secondary deflector for modulating the position of the NVG image projector for displaying the calligraphic imagery.

* * * * *